(12) United States Patent
Co et al.

(10) Patent No.: US 8,438,099 B2
(45) Date of Patent: May 7, 2013

(54) PERIODIC RESET TOTAL RETURN INDEX FUTURES CONTRACTS

(75) Inventors: Richard Co, Chicago, IL (US); TuenTuen Wang, Chicago, IL (US); Xing Su, Chicago, IL (US); John Labuszewski, Westmont, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 32 days.

(21) Appl. No.: 12/914,639

(22) Filed: Oct. 28, 2010

(65) Prior Publication Data

US 2012/0109808 A1    May 3, 2012

(51) Int. Cl.
    *G06Q 40/00* (2006.01)
(52) U.S. Cl.
    USPC .................. 705/37; 705/35; 705/36 R; 705/40
(58) Field of Classification Search .................. None
    See application file for complete search history.

(56) References Cited

U.S. PATENT DOCUMENTS

| | | | |
|---|---|---|---|
| 5,126,936 A * | 6/1992 | Champion et al. .......... | 705/36 R |
| 6,321,212 B1 * | 11/2001 | Lange .......................... | 705/36 R |
| 7,610,232 B2 | 10/2009 | MacPherson | |
| 2002/0194099 A1 * | 12/2002 | Weiss ............... | 705/36 |
| 2003/0236738 A1 * | 12/2003 | Lange et al. .................. | 705/37 |
| 2004/0243499 A1 * | 12/2004 | Bateson et al. ............... | 705/35 |
| 2005/0080734 A1 * | 4/2005 | Lynch et al. .................. | 705/40 |
| 2007/0078746 A1 * | 4/2007 | Ciampi et al. ............. | 705/36 R |
| 2009/0037346 A1 * | 2/2009 | MacPherson ............... | 705/36 R |
| 2009/0177590 A1 * | 7/2009 | Bodurtha et al. ........... | 705/36 R |
| 2009/0271332 A1 * | 10/2009 | Lo et al. ....................... | 705/36 R |

FOREIGN PATENT DOCUMENTS

WO    WO 98/13778    *    4/1998

OTHER PUBLICATIONS

Garbade, K., and Silber, W., 1979. Structural Organization of Secondary Markets: Clearing Frequency, Dealer Activity, and Liquidity Risk, Journal of Finance 34, 577-593.*
Labuszewski, John W., "The CME Group Risk Management Handbook" 2010, pp. 120-124, pp. 148-149, pp. 476-477, John Wiley & Sons, Inc. Hoboken, New Jersey.
International Search Report and Written Opinion in PCT Application No. PCT/US11/55236 dated Dec. 23, 2011.

* cited by examiner

*Primary Examiner* — Robert Niquette
(74) *Attorney, Agent, or Firm* — Brinks Hofer Gilson & Lione (57) ABSTRACT

A periodic reset total return index may be based on a standard index, such as an equity index. The value of the periodic reset total return index may be the sum of the standard index plus the income flow generated by the index, such as dividends generated by stocks. The periodic reset total return index valuation may be deployed as the basis for a futures contract. On a periodic basis, the income flow accrued for the preceding period are passed from the short to the long position holder, with a corresponding adjustment of the settlement price of the contract. The expiration of the contract may be settled at the sum of the underlying index quotation plus the income flow accrual for the previous period. A buyer of a futures contract based on a periodic reset total return index receives the performance of the index plus the intervening income flow accrual.

16 Claims, 9 Drawing Sheets

E-mini S&P 500 Quarterly Reset
Total Return Index Futures Specifications

| | |
|---|---|
| Contract Value | $50 x Quarterly Reset Total Return S&P 500 Index |
| Tick Size | 0.25 Index Points (or $12.50 per tick = 0.25 x $50) |
| Listing Cycle | Five (5) months in March Quarterly Cycle, i.e., March, June September & December |
| Hours of Trade | Offered exclusively on CME Globex® electronic trading platform on Mondays-Thursdays from 5:00 pm–3:15 pm & 3:30 pm–4:30 p.m.; Sundays from 5:00 pm–3:15 pm (CT) |
| Termination of Trading | 8:30 am (CT) on third Friday of contract month |
| Final Settlement | Cash Settlement at value of Quarterly Reset Total Return S&P 500 Index |
| Final Settlement Date | Third (3rd) Friday of contract month with contingencies if Underlying Reference value should not be published on that day |
| Limits | Limits at declines of 10%, 20%, 30% |
| Ticker | Clearing=XXX, Ticker=XXX |

FIG. 6

Appendix: S&P 500 Periodic Reset Total Return Index
(Reset Quarterly)

| | S&P 500 | Daily Dividend | Cumulative Dividend | Quarterly Reset Total Return Index | S&P 500 Total Return Index |
|---|---|---|---|---|---|
| 9/21/09 | 1,064.66 | 0.00 | 0.00 | 1,064.66 | 1,744.47 |
| 9/22/09 | 1,071.66 | 0.83 | 0.83 | 1,071.69 | 1,755.99 |
| 9/23/09 | 1,060.87 | 0.01 | 0.04 | 1,060.91 | 1,738.32 |
| 9/24/09 | 1,050.78 | 0.14 | 0.18 | 1,050.96 | 1,722.02 |
| 9/25/09 | 1,044.38 | 0.00 | 0.18 | 1,044.56 | 1,711.53 |
| 9/28/09 | 1,062.98 | 0.18 | 0.36 | 1,063.34 | 1,742.32 |
| 9/29/09 | 1,060.61 | 0.04 | 0.40 | 1,061.01 | 1,738.48 |
| 9/30/09 | 1,057.08 | 0.10 | 0.50 | 1,057.58 | 1,732.86 |
| 10/1/09 | 1,029.85 | 0.01 | 0.51 | 1,030.36 | 1,688.24 |
| 10/2/09 | 1,025.21 | 0.04 | 0.55 | 1,025.76 | 1,680.70 |
| 10/5/09 | 1,040.46 | 0.02 | 0.57 | 1,041.03 | 1,705.73 |
| 10/6/09 | 1,054.72 | 0.02 | 0.59 | 1,055.31 | 1,729.14 |
| 10/7/09 | 1,057.58 | 0.55 | 1.14 | 1,058.72 | 1,734.24 |
| 10/8/09 | 1,065.48 | 0.00 | 1.14 | 1,066.62 | 1,747.20 |
| 10/9/09 | 1,071.49 | 0.03 | 1.17 | 1,072.66 | 1,757.60 |
| 10/12/09 | 1,076.19 | 0.00 | 1.17 | 1,077.36 | 1,765.31 |
| 10/13/09 | 1,073.19 | 0.07 | 1.24 | 1,074.43 | 1,760.51 |
| 10/14/09 | 1,092.02 | 0.04 | 1.28 | 1,093.30 | 1,791.47 |
| 10/15/09 | 1,096.56 | 0.00 | 1.28 | 1,097.84 | 1,798.51 |
| 10/16/09 | 1,087.68 | 0.00 | 1.28 | 1,088.96 | 1,784.35 |
| 10/19/09 | 1,097.91 | 0.00 | 1.28 | 1,099.19 | 1,801.12 |
| 10/20/09 | 1,091.06 | 0.02 | 1.30 | 1,092.36 | 1,789.93 |
| 10/21/09 | 1,081.40 | 0.16 | 1.46 | 1,082.86 | 1,774.33 |
| 10/22/09 | 1,092.91 | 0.07 | 1.53 | 1,094.44 | 1,793.34 |
| 10/23/09 | 1,079.60 | 0.00 | 1.53 | 1,081.13 | 1,771.50 |
| 10/26/09 | 1,066.95 | 0.01 | 1.54 | 1,068.49 | 1,750.75 |
| 10/27/09 | 1,063.41 | 0.00 | 1.54 | 1,064.95 | 1,744.95 |
| 10/28/09 | 1,042.63 | 0.14 | 1.68 | 1,044.31 | 1,711.09 |
| 10/29/09 | 1,066.11 | 0.09 | 1.77 | 1,067.88 | 1,749.76 |
| 10/30/09 | 1,036.19 | 0.00 | 1.77 | 1,037.96 | 1,700.67 |
| 11/2/09 | 1,042.88 | 0.01 | 1.78 | 1,044.66 | 1,711.65 |
| 11/3/09 | 1,045.41 | 0.01 | 1.79 | 1,047.20 | 1,715.81 |
| 11/4/09 | 1,046.50 | 0.36 | 2.15 | 1,048.65 | 1,718.21 |
| 11/5/09 | 1,066.63 | 0.12 | 2.27 | 1,068.90 | 1,751.45 |
| 11/6/09 | 1,069.30 | 0.14 | 2.41 | 1,071.71 | 1,756.07 |
| 11/9/09 | 1,093.08 | 0.27 | 2.68 | 1,095.76 | 1,795.56 |
| 11/10/09 | 1,093.01 | 0.28 | 2.96 | 1,095.97 | 1,795.90 |
| 11/11/09 | 1,098.51 | 0.00 | 2.96 | 1,101.47 | 1,804.93 |
| 11/12/09 | 1,087.24 | 0.15 | 3.11 | 1,090.35 | 1,786.66 |
| 11/13/09 | 1,093.48 | 0.00 | 3.11 | 1,096.59 | 1,796.93 |
| 11/16/09 | 1,109.30 | 0.23 | 3.34 | 1,112.64 | 1,823.29 |
| 11/17/09 | 1,110.32 | 0.13 | 3.47 | 1,113.79 | 1,825.18 |
| 11/18/09 | 1,109.80 | 0.17 | 3.64 | 1,113.44 | 1,824.61 |
| 11/19/09 | 1,094.90 | 0.00 | 3.64 | 1,098.54 | 1,800.12 |
| 11/20/09 | 1,091.38 | 0.20 | 3.84 | 1,095.22 | 1,794.65 |
| 11/23/09 | 1,106.24 | 0.05 | 3.89 | 1,110.13 | 1,819.17 |
| 11/24/09 | 1,105.65 | 0.06 | 3.95 | 1,109.60 | 1,818.31 |
| 11/25/09 | 1,110.63 | 0.15 | 4.10 | 1,114.73 | 1,826.74 |
| 11/27/09 | 1,091.49 | 0.26 | 4.36 | 1,095.85 | 1,795.76 |
| 11/30/09 | 1,095.63 | 0.11 | 4.47 | 1,100.10 | 1,802.68 |

FIG. 7A

Appendix: S&P 500 Periodic Reset Total Return Index, cont. (Reset Quarterly)

| | S&P 500 | Daily Dividend | Cumulative Dividend | Quarterly Reset Total Return Index | S&P 500 Total Return Index |
|---|---|---|---|---|---|
| 12/1/09 | 1,108.86 | 0.05 | 4.52 | 1,113.38 | 1,824.54 |
| 12/2/09 | 1,109.24 | 0.15 | 4.67 | 1,113.91 | 1,825.45 |
| 12/3/09 | 1,099.92 | 0.04 | 4.71 | 1,104.63 | 1,810.13 |
| 12/4/09 | 1,105.98 | 0.01 | 4.72 | 1,110.70 | 1,820.11 |
| 12/7/09 | 1,103.25 | 0.04 | 4.76 | 1,108.01 | 1,815.79 |
| 12/8/09 | 1,091.94 | 0.14 | 4.90 | 1,096.84 | 1,797.31 |
| 12/9/09 | 1,095.95 | 0.12 | 5.02 | 1,100.97 | 1,804.10 |
| 12/10/09 | 1,102.35 | 0.10 | 5.12 | 1,107.47 | 1,814.81 |
| 12/11/09 | 1,106.41 | 0.19 | 5.31 | 1,111.72 | 1,821.89 |
| 12/14/09 | 1,114.11 | 0.04 | 5.35 | 1,119.46 | 1,834.55 |
| 12/15/09 | 1,107.93 | 0.00 | 5.35 | 1,113.28 | 1,824.37 |
| 12/16/09 | 1,109.18 | 0.01 | 5.36 | 1,114.54 | 1,826.45 |
| 12/17/09 | 1,096.08 | 0.05 | 5.41 | 1,101.49 | 1,804.95 |
| 12/18/09 | 1,102.47 | 0.01 | 5.42 | 1,107.89 | 1,815.59 |
| 12/21/09 | 1,114.05 | 0.02 | 0.02 | 1,114.07 | 1,834.39 |
| 12/22/09 | 1,118.02 | 0.01 | 0.03 | 1,118.05 | 1,841.17 |
| 12/23/09 | 1,120.59 | 0.25 | 0.28 | 1,120.87 | 1,845.80 |
| 12/24/09 | 1,126.48 | 0.00 | 0.28 | 1,126.76 | 1,855.55 |
| 12/28/09 | 1,127.78 | 0.15 | 0.43 | 1,128.21 | 1,857.89 |
| 12/29/09 | 1,126.20 | 0.19 | 0.62 | 1,126.82 | 1,855.61 |
| 12/30/09 | 1,126.42 | 0.11 | 0.73 | 1,127.15 | 1,856.14 |
| 12/31/09 | 1,115.10 | 0.00 | 0.73 | 1,115.83 | 1,837.98 |
| 1/4/10 | 1,132.99 | 0.06 | 0.79 | 1,133.78 | 1,867.06 |
| 1/5/10 | 1,136.52 | 0.00 | 0.79 | 1,137.31 | 1,872.92 |
| 1/6/10 | 1,137.14 | 0.50 | 1.29 | 1,138.43 | 1,874.73 |
| 1/7/10 | 1,141.69 | 0.06 | 1.35 | 1,143.04 | 1,882.34 |
| 1/8/10 | 1,144.98 | 0.00 | 1.35 | 1,146.33 | 1,887.77 |
| 1/11/10 | 1,146.98 | 0.00 | 1.35 | 1,148.33 | 1,891.05 |
| 1/12/10 | 1,136.22 | 0.00 | 1.35 | 1,137.57 | 1,873.32 |
| 1/13/10 | 1,145.68 | 0.11 | 1.46 | 1,147.14 | 1,889.19 |
| 1/14/10 | 1,148.46 | 0.03 | 1.49 | 1,149.95 | 1,893.73 |
| 1/15/10 | 1,136.03 | 0.04 | 1.53 | 1,137.56 | 1,873.32 |
| 1/19/10 | 1,150.23 | 0.00 | 1.53 | 1,151.76 | 1,896.72 |
| 1/20/10 | 1,138.04 | 0.17 | 1.70 | 1,139.74 | 1,876.80 |
| 1/21/10 | 1,116.48 | 0.03 | 1.73 | 1,118.21 | 1,841.39 |
| 1/22/10 | 1,091.76 | 0.00 | 1.73 | 1,093.49 | 1,800.61 |
| 1/25/10 | 1,096.78 | 0.02 | 1.75 | 1,098.53 | 1,808.93 |
| 1/26/10 | 1,092.17 | 0.02 | 1.77 | 1,093.94 | 1,801.34 |
| 1/27/10 | 1,097.50 | 0.03 | 1.80 | 1,099.30 | 1,810.21 |
| 1/28/10 | 1,084.53 | 0.10 | 1.90 | 1,086.43 | 1,788.87 |
| 1/29/10 | 1,073.87 | 0.01 | 1.91 | 1,075.78 | 1,771.40 |
| 2/1/10 | 1,089.19 | 0.00 | 1.91 | 1,091.10 | 1,796.67 |
| 2/2/10 | 1,103.32 | 0.00 | 1.91 | 1,105.23 | 1,819.99 |
| 2/3/10 | 1,097.28 | 0.37 | 2.28 | 1,099.56 | 1,810.64 |
| 2/4/10 | 1,063.11 | 0.03 | 2.31 | 1,065.42 | 1,754.35 |
| 2/5/10 | 1,066.19 | 0.01 | 2.32 | 1,068.51 | 1,759.38 |
| 2/8/10 | 1,056.74 | 0.34 | 2.66 | 1,059.40 | 1,744.37 |
| 2/9/10 | 1,070.52 | 0.04 | 2.70 | 1,073.22 | 1,767.10 |
| 2/10/10 | 1,068.13 | 0.28 | 2.98 | 1,071.11 | 1,763.69 |
| 2/11/10 | 1,078.47 | 0.15 | 3.13 | 1,081.60 | 1,781.01 |
| 2/12/10 | 1,075.51 | 0.23 | 3.36 | 1,078.87 | 1,776.58 |
| 2/16/10 | 1,094.87 | 0.15 | 3.51 | 1,098.38 | 1,808.73 |

Appendix: S&P 500 Periodic Reset Total Return Index, cont.
(Reset Quarterly)

| | S&P 500 | Daily Dividend | Cumulative Dividend | Quarterly Reset Total Return Index | S&P 500 Total Return Index |
|---|---|---|---|---|---|
| | 810 | 820 | 830 | 840 / 850 | 860 |
| 2/17/10 | 1,099.51 | 0.19 | 3.79 | 1,103.21 | 1,816.79 |
| 2/18/10 | 1,106.03 | 0.08 | 3.78 | 1,109.81 | 1,827.54 |
| 2/2/10 | 1,103.32 | -1.87 | 1.91 | 1,105.23 | 1,819.99 |
| 2/3/10 | 1,097.28 | 0.37 | 2.28 | 1,099.56 | 1,810.64 |
| 2/4/10 | 1,063.11 | 0.03 | 2.31 | 1,065.42 | 1,754.38 |
| 2/5/10 | 1,066.19 | 0.01 | 2.32 | 1,068.51 | 1,759.38 |
| 2/8/10 | 1,056.74 | 0.34 | 2.66 | 1,059.40 | 1,744.37 |
| 2/9/10 | 1,070.52 | 0.04 | 2.70 | 1,073.22 | 1,767.18 |
| 2/10/10 | 1,068.13 | 0.28 | 2.98 | 1,071.11 | 1,763.69 |
| 2/11/10 | 1,078.47 | 0.15 | 3.13 | 1,081.60 | 1,781.01 |
| 2/12/10 | 1,075.51 | 0.23 | 3.36 | 1,078.87 | 1,776.50 |
| 2/16/10 | 1,094.87 | 0.15 | 3.51 | 1,098.38 | 1,809.72 |
| 2/17/10 | 1,099.51 | 0.19 | 3.70 | 1,103.21 | 1,816.79 |
| 2/18/10 | 1,106.03 | 0.08 | 3.78 | 1,109.81 | 1,827.54 |

PERIODIC RESET TOTAL RETURN INDEX FUTURES CONTRACTS

TECHNICAL FIELD

This patent document generally relates to a system and method, hereinafter generally referred to as a system, for listing and trading of periodic reset total return index futures. And particularly, but not exclusively, this patent document relates to the implementation of a periodic reset system mechanism and algorithm at the clearing house of a derivative exchange that facilitates and results a periodic exchange of cash flow between long and short position holders. The periodic exchange of cash flow represents the income realized on the underlying asset of the index futures.

BACKGROUND

Many known traded stock index futures are often based on a price index representing the current price of the plurality of securities underlying the index. The computation of these known price indexes disregards dividends and any other income that the holder of the underlying securities collects. Accordingly, a futures contract based on a price index such as, for example, the S&P 500 index, the Dow Jones Industrial Average, or the NASDAQ-100 index, trades at a price that reflects an estimate of any intervening dividend or other income foregone by holding the futures contract instead of holding the underlying securities. Textbook discussions of (price) index futures pricing, for example, typically include a "fair value" formula that takes into consideration the prevailing interest rate as well as the estimated dividend between the trade date and the expiration of the futures contract. While the interest rate component is an observable variable, based only on information about the current credit market condition; the dividend component will only be realized over the course of the remainder of the life of the futures contract. As such, the dividend component is a random variable that represents a risk factor for the traders of price index futures.

Other known traded stock index futures such as the total return index are calculated to reflect the accrual of any dividend and other income from the underlying securities of the index as well as the reinvestment of the accrued dividend and income in the underlying securities. Futures contracts based on a total return index eliminate the dividends and income accrual as a source of risk.

Applying the price index and total return index methodology to the same portfolio of securities results in the two diverging time series of index value, owing to the compounding effect of the inclusion of dividend in the latter but not the former. As such, a futures contact based on, for example, a total return index associated with the S&P 500 index portfolio will have prices that are unrecognizable for followers of the predominantly reported index, the S&P 500 price index.

SUMMARY

The system, method and algorithm contemplated in this patent document calls for a periodic reset total return index futures contract based primarily on a price index, for which a series of periodic exchange of cash flows as well as price adjustments and/or resets may be transacted and facilitated by a central counterparty or clearing house to account for the effects of the dividend or income accrual. In this way, the cash flow, price adjustments and/or resets transacted with respect to the price of the futures contract ensures that the futures contract tracks the more commonly disseminated price index while explicitly accounting for or addressing the uncertainty due to the dividend accrual. In particular, the price differential between the disclosed periodic reset total return index futures based on the S&P 500 and the regular S&P 500 price index futures will represent the anticipated dividend accrual in the intervening period prior to their common expiration date. Traders can choose the version of the contract that would be more in-line with their view on dividends.

A system for valuating a periodic reset total return index may include a memory, an interface, and a processor. The system may operate as a component and/or subsystem of, for example, a match engine or other component of an exchange or clearinghouse. Alternatively, the system may represent a standalone process or algorithm implemented by the memory, interface and processor. In an embodiment, the memory may be operative to store a first valuation of an index and a second valuation of an income flow generated by the index. The interface may be communicatively coupled to the memory which may, in turn, be in communication with the exchange, match engine and/or order book, and may be operative to receive the first valuation of the index and the second valuation of the income flow, such as from a third party server.

The processor portion of the disclosed valuation subsystem may be coupled to the memory and the interface, and the processor may receive, via the interface, the first valuation of the index and the second valuation of the income flow for a current period. The processor may calculate a third valuation of a periodic reset total return index by adding the first valuation of the index and the second valuation of the income flow for the current period. The processor may adjust, on a periodic basis, the third valuation of the periodic reset total return index based on the first valuation of the index. The processor may provide the third valuation of the periodic reset total return index to one or more market participants in communication with the exchange.

The exchange, in cooperation with the exemplary valuation system and algorithm, may adjust the account for each position holder on each of the predefined reset dates. For example, changes or adjustments represented by the third valuation and/or the final valuation of the cash flow amount for a specific period require that the system or algorithm debit or credit the account of the holders of each long and short position to reflect the necessary price adjustment. The exemplary system may cooperate with the exchange to issue a debit instruction to holder of short position, and issue a credit to the holder of the long position, and adjust to the daily settlement price of the periodic reset total return index futures and the associated variation margin. Typically, the debit and credit instructions to each of the open interest holders offset each other except for the final settlement. The net result is that the futures contract will resume trading after the reset at a lower price that accounts for the periodic settlement of the dividend component that just concluded. At the final settlement, the periodic reset total return index futures will be mark-to-market based on the final settlement price associated with the price index. The final mark-to-market process and the attendant cash variation payment can be handled by existing clearing house systems associated with the exchange.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIGS. 7A-C are tables of exemplary values over a period of time for a stock index, a total return index based on the stock index and a periodic reset total return index based on the stock index.

DETAILED DESCRIPTION

An exemplary system and method, generally referred to as a system, may relate to facilitating the listing and trading of a periodic reset total return index futures contract is discussed and disclosed herein. Periodic reset total return index futures contracts are intermediated by an exchange and a clearing house, which may or may not be intermediating the trading and clearing of index futures based on the same underlying index portfolios. For the purpose of facilitating the listing and trading of a periodic reset total return index futures, the exemplary exchange and/or the clearing house may (i) deploy a system to capture information about and evaluate and disseminate the information about the monetary value of the dividend payment associated with a portfolio of stock or other securities represented by a stock index or securities index; and (ii) deploy or adapt their current settlement and bookkeeping system to make a series of cash flow and price adjustments to the periodic reset total return index futures contracts.

For example, periodic reset total return index futures configured and constructed according to the teaching and disclosure provided herein may have a reset period of approximately three months. The reset period may be any arbitrary period such as, for example, weekly, monthly, bi-monthly, or any other desired period of time. On one alternate embodiment, the reset period may be a daily reset. The choice of a three-month reset period conforms to the current U.S. industry practice of quarterly index futures listings. Moreover, based on the current practice, the reset dates can be chosen to coincide with the quarterly expiration dates of the stock index futures, currently the third Friday of the contract month.

A stock price index may be defined as the weighted sum of the (current) prices of the stocks in the index, appropriately scaled by a factor commonly known as the index divisor. The index divisor is an arbitrary number that is first defined when the stock price index is first published and is utilized to divide the total value of the index to produce an initial index value that is a number which is easy to handle, such as the number 100 or 1000. The index divisor is typically a constant number, but may be adjusted over time to reflect changes in securities within the index, stock splits etc. The relatively constant nature of the index divisor enables comparability within the index over time.

For example, the stock price index may include 212.3 shares of stock A, 38.3 shares of stock B, etc. Thus, the value of the stock price index is the (current) value of this basket of stocks divided by the index divisor. On each business day, one or several of the stocks in the index portfolio may be trading on "ex-dividend" basis, i.e. for the owner of the stock to receive the dividend issued by the company, the owner is required to have purchased the stock prior to the ex-dividend day. Buyers of the stock on or after the ex-dividend day aren't eligible to receive the upcoming dividend payment from the company issuing the stock. As such, on each business day, the owner of the stock portfolio will possess two collections of assets: (i) the stock portfolio, valued at the current stock prices, and (ii) the accrued dividend which may or may not have been received yet by the owner. During the exemplary three-month reset period, the total dividend accrual for the index is equal to the sum total of the dividends accrued to the stock portfolio, divided by the index divisor. Division by the index divisor scales the dividend income in order to ensure that it is comparable with the index level. Thus, the "total return" of owning the index portfolio can be measured by the changes in the index plus the index dividend accrual. Likewise, the concept can be extended to securities or assets of other kinds, e.g. fixed income securities with the pro-rated coupon income, residential real estate and rental income, etc.

In order to implement the periodic reset total return index futures, the clearing house may operate and/or communicate with two subsystems or processors configured to implement the exemplary algorithm and process. One exemplary subsystem or process that may be executed by the exchange and/or clearinghouse may be configured to analyze, capture and store information regarding the cumulative sum of the dividends accrued between two resets points. If, for example, the daily dividend accrual information is not published, the subsystem or process may be configured to capture the pertinent information from a public data dissemination system provided by the index publisher. Alternatively, if the publisher does not provide such information, the subsystem or processor can be configured to collect dividend information for each of the underlying securities in the index from publically available information source, e.g. a Bloomberg terminal. The exchange and/or clearing house implementing this exemplary algorithm and process may, in turn, calculate the appropriate dividend accrual information based on, for example, the weight or number of shares of each stock in the index, appropriately scaled by the index divisor. The subsystem and or process may further continually and/or dynamically monitor the changes to the composition of the index dictated by the index publishers via electronic information retrieval. The subsystem and or process may also allow customers to retrieve the detailed dividend accrual information for verification purpose.

A second exemplary subsystem or process that may be executed by the exchange and/or clearinghouse may be configured to interact with existing futures bookkeeping system in the clearinghouse to perform the actual reset. For example, on a predefined reset date, at the close of the trading session of the periodic reset total return index futures, the exemplary subsystem may (i) retrieve the cumulative dividend accrual amount appropriate for the period following the last reset date until the current reset date, (ii) issue a change in the daily settlement price for the periodic reset total return index futures contract, e.g., if the daily settlement price for the periodic reset total return index futures is identified as P, and the appropriate dividend accrual amount is identified as Q, the amended daily settlement price for the periodic reset total return index futures contract will be max(P−Q, 0); (iii) issue a variation margin call for the short to pay and the long to collect equal to the M×Q, where M denotes the contract dollar multiplier for the futures contract. On any day other than the final settlement day of the contract, it is likely that the variation margin payment due to the change in the settlement price shall offset the special variation margin. This relationship is established to "excise" the dividend accrual from the futures prices going forward. In other words, regardless of how long the futures has been listed, the price of the periodic reset total return index futures will reflect only the value of the underlying portfolio and the future stream of dividends, including all dividends within the current reset period, but not the dividends accrued in the previous accrual period. Thus, the contract will resemble a normal futures contract, in that the price of the futures will converge with the underlying index, and not distorted by the dividend accruals in the past reset periods.

The principles, process and/or algorithm described herein may be embodied in many different forms. For explanatory purposes, the periodic reset total return index is referenced in the context of an equity index, such as a stock index. The income flow accrual of the stock index may be in the form of dividends accrued by the individual stocks of the index. However, the index valuation discussed herein may be used to value a periodic reset total return index based on any index in which the constituents accrue income flow over a period of time. For example, a periodic reset total return index may be based on a fixed income index and the income flow accrued may be the coupon payments or other income flows associated with the constituents of the index.

Figure 1:
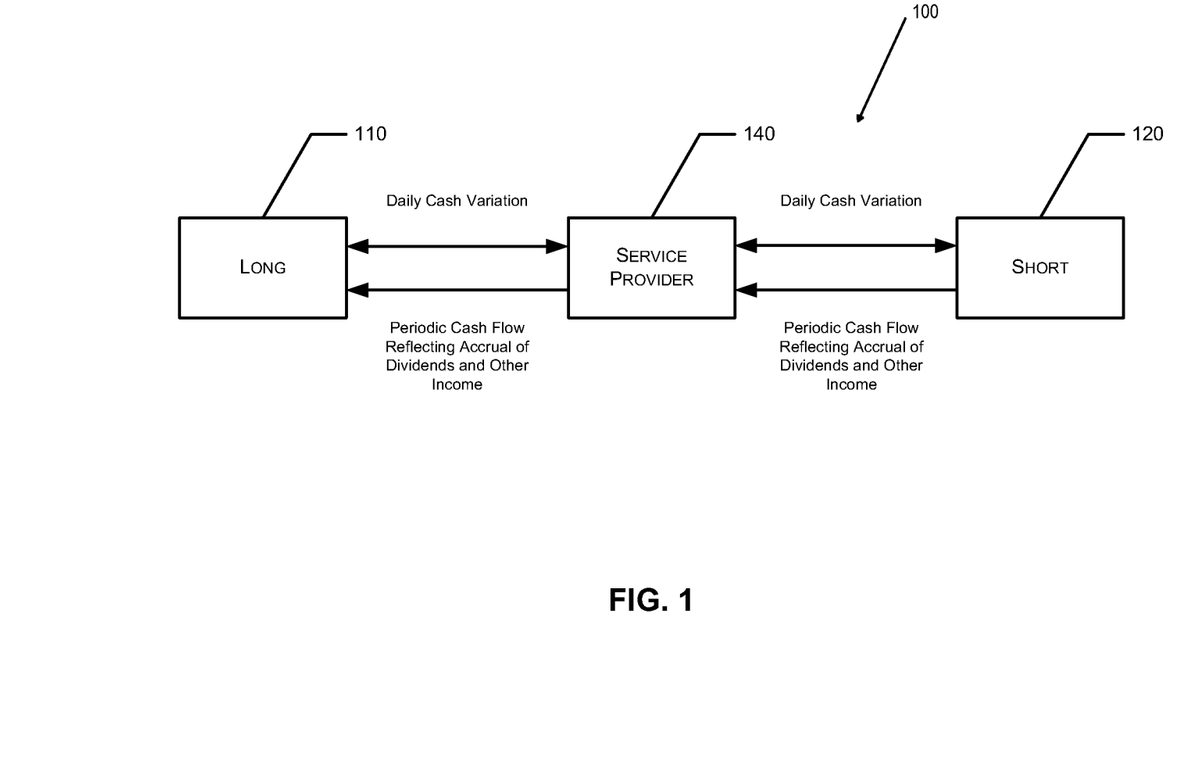
FIG. 1 is a block diagram illustrating market participants engaging in a futures contract based on a periodic reset total return index valuation.

FIG. 1 is a process flow 100 illustrating market participants engaging in a futures contract based on a periodic reset total return index valuation. The process flow 100 may include one or more long position holders 110, one or more short position holders 120, and a service provider 140. The service provider 140 may be an exchange, such as the Chicago Mercantile Exchange™ located in Chicago, Ill. The service provider 140 may operate as an intermediary to facilitate financial transactions, such as futures contracts, between market participants, such as the long position holder 110 and the short position holder 120. The service provider 140 may include a clearinghouse which acts as a counterparty to each financial transaction between market participants. The service provider 140 may provide one or more index quotations, or valuations, to the market participants, which may be used as the quotation and accounting basis for futures contracts. A futures contract may be a contract between market participants, such as the long position holder 110 and the short position holder 120, to buy or sell a quantity of the index at a specified future date at an agreed price. The clearinghouse of the service provider 140 may act as an intermediary and counterparty on the futures contract. The service provider 140 may also provide an index valuation for the futures contract, and may provide a mechanism for settling the futures contract.

For example, the service provider 140 may determine and provide a periodic reset total return index valuation. The periodic reset total return index may be based on an underlying price index, such as a stock index, plus the value of income flows, such as dividends, accrued by the constituents of the underlying index through the expiration of the futures. The periodic reset total return index may be determined by calculating the sum of the value of the underlying price index plus the income flow accrual total for the current period. The period may be any period of time that may be specified in a futures contract, such as monthly, quarterly, yearly, etc. The steps of a periodic reset total return index valuation are discussed in more detail in connection with FIG. 3.

In the process flow 100, the long position holder 110 may enter into a futures contract with the short position holder 120 based on the periodic reset total return index. Exemplary terms for a future contract based on a periodic reset total return index are discussed in more detail in connection with FIG. 7. The futures contract may specify the periodic basis upon which the periodic reset total return index resets, and accrued income flow is passed from the short position holder 120 to the long position holder 110. The periodic basis may be a monthly basis, a quarterly basis, an annual basis, or generally any periodic basis. At the expiration of each period, any income flow accrued by the constituents of the underlying index, such as dividends accrued by stocks, are passed from the short position holder 110 to the long position holder 120. For example, if the period is quarterly, on the third Friday of the March, June, September and December calendar months, the income flow accrued by the constituents of the underlying index for the preceding three months may be passed from the short position holder 120 to the long position holder 110. The service provider 140 may provide a mechanism for passing the income flow accruals from the short position holder 110 to the long position holder 120. At the expiration of the futures contract, the contract settles at the index special opening quotation plus the index income flow accrual, such as index dividend accrual, for the previous quarter. The service provider 120 may provide a mechanism for the short position holder 110 and the long position holder 120 to settle the futures contract. Thus, the long position holder 120 effectively receives the performance of the index plus all the intervening periodic index income flow accrual, such as quarterly index dividend accrual. The steps of clearing the futures contract by the service provider 140 are discussed in more detail in connection with FIG. 4.

A periodic reset total return index may trade at a value above that of the underlying index due to the income flow accrual. For example, as of Feb. 19, 2010, a June 2010 futures contract based on a periodic reset total return index may trade at a price above that of a futures contract based on the underlying index, such as the S&P 500, with the same June 2010 expiration. The difference of the two prices may reflect the anticipated quarterly dividends total for the quarters ending Mar. 19, 2010 and Jun. 18, 2010. Assuming the expected difference is 6.00 index points each quarter, the periodic reset total return index future may be priced at 12.00 index points higher than the futures contract based on the underlying index. On Mar. 19, 2010, the short position holder 120 of record as of the preceding business day may pay the long position holder 110 of record as of the preceding business day the quarterly index dividend total for the preceding quarter. For example, the dividend accrual may turn out to be 5.90 index points, while the dividend for the next quarter remains at 6.00 index points. Thus, the latter implies that the periodic reset total return future would settle only 6.00 above the underlying index futures, representing a gain of 6.00 index points while paying 5.90 index points as dividend back to the long position holder, resulting in a net gain of 0.10 index points that reflects the correct call on the dividend part of the trade. However, if the accrued dividend were identical to the anticipated dividend, e.g. 6.00 index points in the above example, the mark-to-market adjustment would offset the accrued dividend payment, resulting in net zero payment due to the dividend, which would be the expected outcome. The same analysis may apply at the final settlement of the contract. Thus, a periodic reset total return index future effectively mimics the behavior of owning the index stock portfolio by providing the dividend payments to the long position holder.

Figure 5:
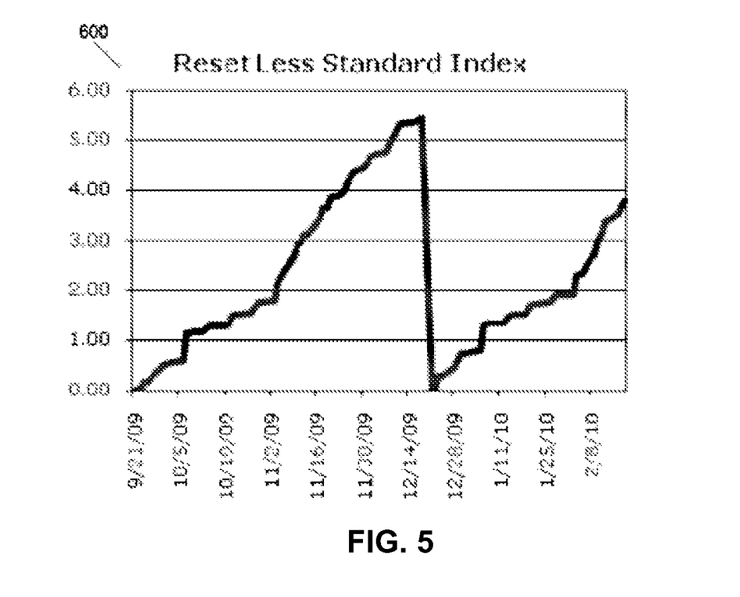
FIG. 5 is a graph illustrating the difference in value between a stock index and a periodic reset total return index based on the stock index.
Figure 6:
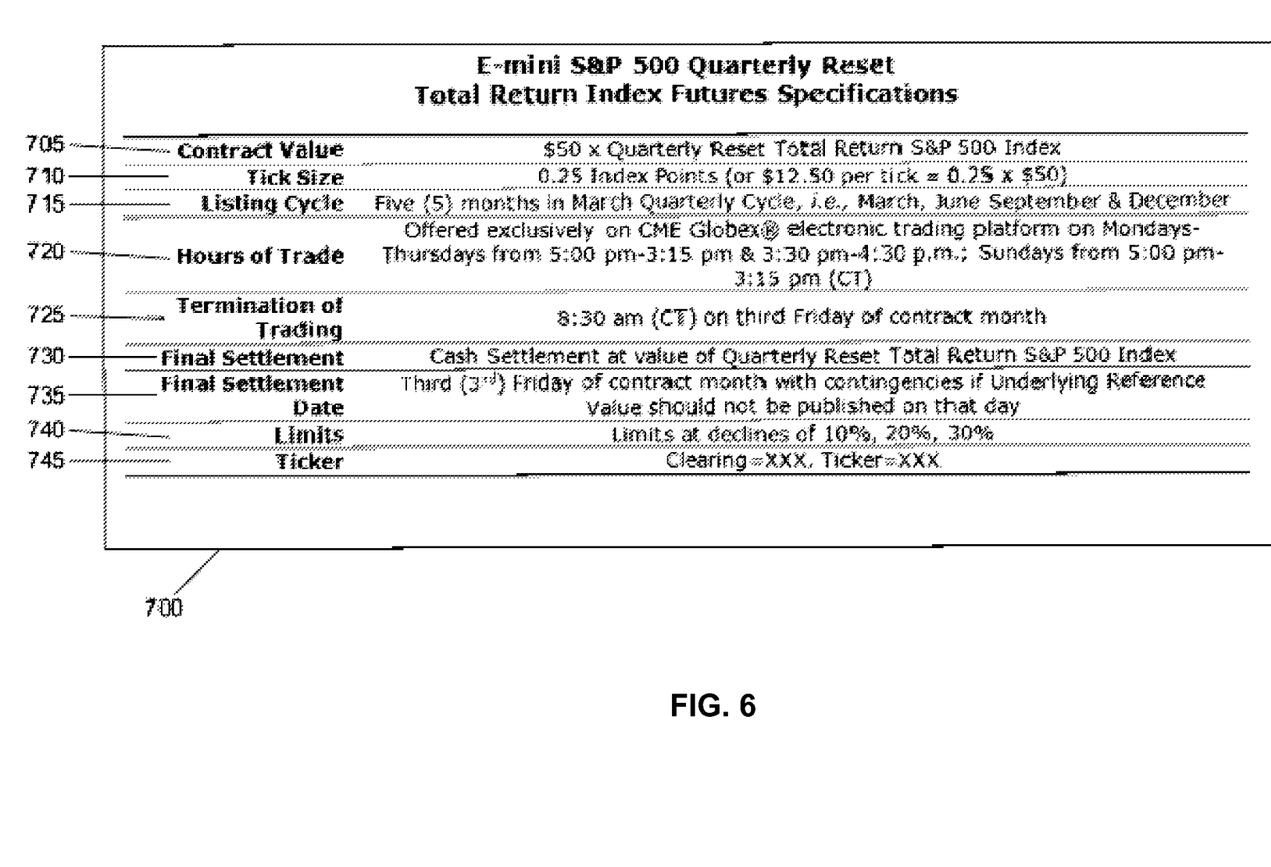
FIG. 6 is a table of exemplary terms of a futures contract based on a periodic reset total return index.

Since the periodic reset total return index futures are effectively traded with the anticipated dividend for the intervening period, the pricing will be familiar to the market participants, unlike a total return index. An exemplary comparison between an underlying index and a periodic reset total return index are discussed in more detail in FIG. 5 and FIG. 6. FIG. 5 and FIG. 6 illustrate the ease of comprehending the attribution of the dividends to the index. An exemplary comparison over a period of time between a standard index, a total return index, and a periodic reset total return index are discussed in more detail in FIGS. 8A-C. FIGS. 8A-C illustrate the differences between a total return index and a periodic reset total return index.

Figure 2:
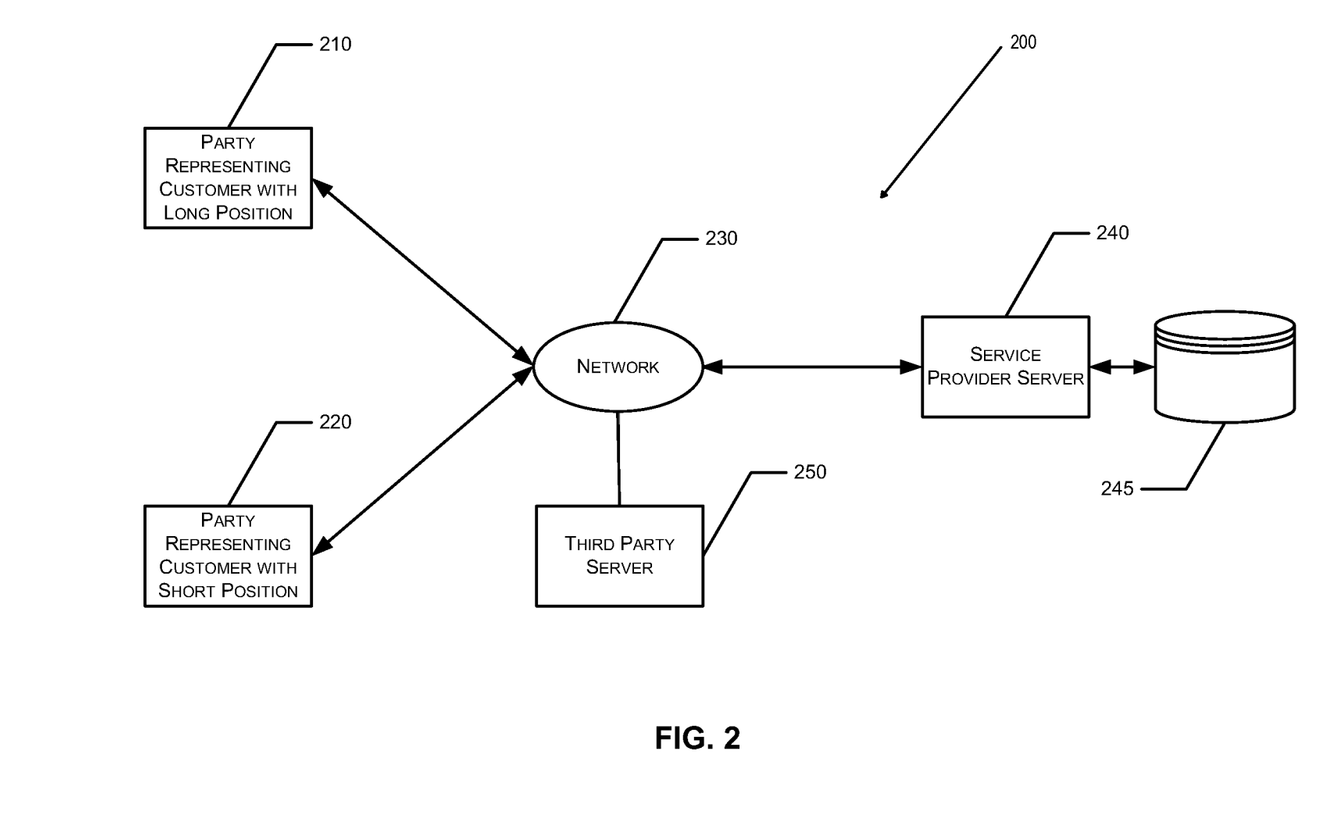
FIG. 2 is a block diagram of a network environment implementing the periodic reset total return index valuation of FIG. 1, or other systems incorporating a periodic reset total return index valuation.

FIG. 2 is a block diagram of a network environment implementing the periodic reset total return index valuation of FIG. 1, or other systems incorporating a periodic reset total return index valuation. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more long computing devices 210, one or more short computing devices 220, a network 230, a service provider server 240, a data store 245, and one or more third party servers 250. The computing devices 210, 220 may be used by market participants to interact with the service provider 140 through the service provider server 240. The third party server 250 may provide information to the service provider server 240, such as valuations of standard indexes, such as the S&P 500 stock index, and income flow accrual, such as dividend accrual, of the constituents of the standard index for a given period. The data store 245 may be operative to store data, such as data relating to valuations of indexes and valuations of periodic income flows accrued by constituents of indexes.

The data store 245 may include one or more relational databases or other data stores that may be managed using various known database management techniques, such as, for example, SQL and object-based techniques. Alternatively or in addition the data store 245 may be implemented using one or more of the magnetic, optical, solid state or tape drives. The data store 245 may be in communication with the service provider server 240.

The network 230 may be configured to couple one computing device to another computing device to enable communication of data between the devices. The network 230 may include one or more of a wireless network, a wired network, a local area network (LAN), a wide area network (WAN), a direct connection such as through a Universal Serial Bus (USB) port, and the like, or any other networks that may allow for data communication, and may include the set of interconnected networks that make up the Internet. The network 230 may be divided into sub-networks. The sub-networks may allow access to all of the other components connected to the network 230 in the network environment 200, or the sub-networks may restrict access between the components connected to the network 230. The network 230 may be regarded as a public or private network connection and may include, for example, a virtual private network or an encryption or other security mechanism employed over the public Internet, or the like.

The computing devices 210, 220 may communicate with the service provider server 240 via the network 230. The computing devices 210, 220 may run one or more web applications, standalone applications or mobile applications for interacting with the service provider server 240. The market participants may access user interfaces for engaging in financial transactions through the service provider server 240. The computing devices 210, 220 may be connected to the network 230 in any configuration that supports data transfer. This may include a data connection to the network 230 that may be wired or wireless, such as a cellular connection, a wireless data connection, an Internet connection, an infrared connection, a Bluetooth connection, or any other connection capable of transmitting data. The computing devices 210, 220 may be any network enabled device, such as a computer, a mobile phone, personal digital assistant (PDA), pager, network-enabled television, digital video recorder, such as an appliance or any other device capable of data communications.

The service provider server 240, and the third party server 250, may include one or more of the following: an application server, a data store, such as the data store 245, a database server, a middleware server, and an advertising services server. The service provider server 240 may exist on one machine or may be running in a distributed configuration on one or more machines. The service provider server 240 may receive communications from the computing devices 210, 220, such as HTTP requests, and may serve data to the computing devices 210, 220 based on the received communications.

The computing devices 210, 220, the service provider server 240, and the third party server 250, may be one or more computing devices of various kinds, such as the computing device described in FIG. 9 below. Such computing devices may generally include any device that may be configured to perform computation, such as through a processor, and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite.

Figure 3:
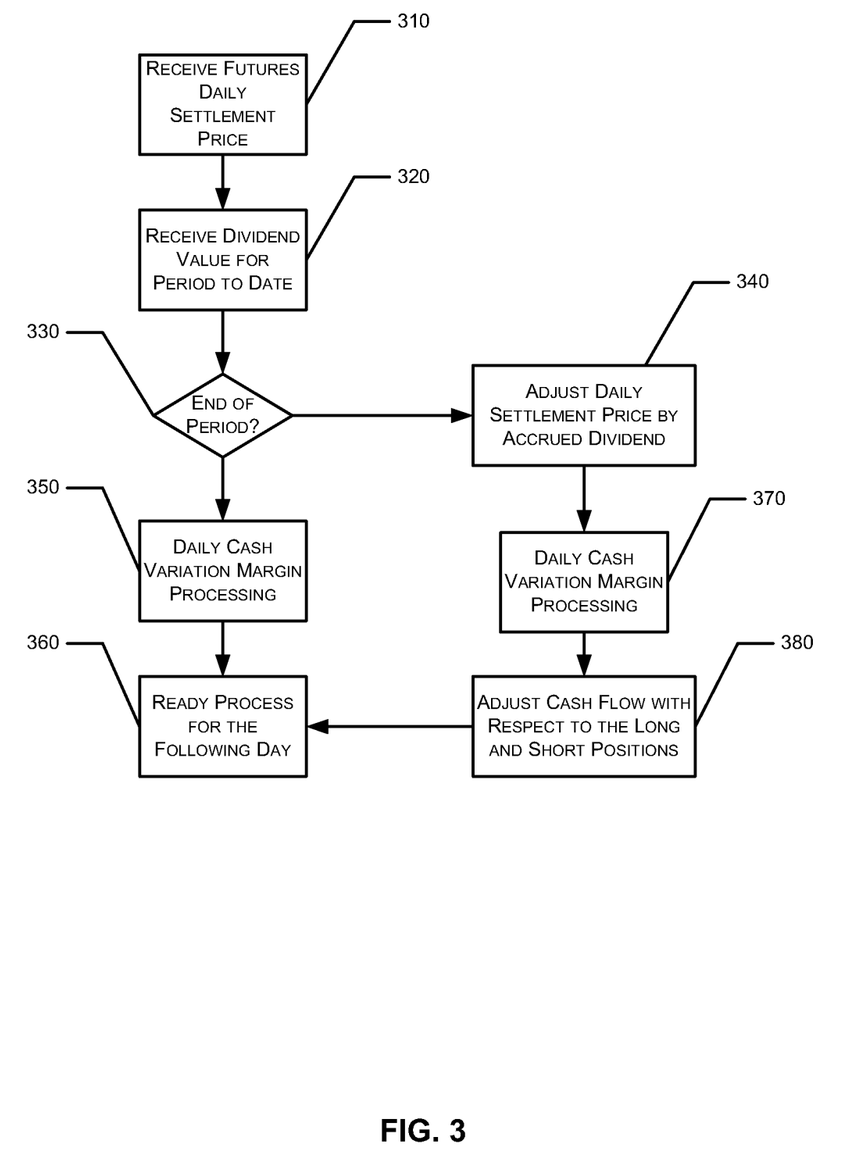
FIG. 3 is a flowchart illustrating a periodic reset total return index valuation in the system of FIG. 1, or other systems incorporating a periodic reset total return index valuation.

FIG. 3 is a flowchart illustrating the periodic reset total return index valuation in the system of FIG. 1, or other systems incorporating a periodic reset total return index valuation. The steps of FIG. 3 are described as being performed by the service provider server 240. However, the steps may be performed by the processor of the service provider server 240, or by any other hardware component of the service provider server 240. Alternatively the steps may be performed by an external hardware component. The steps, process and algorithm disclosed and discussed herein provides a transformation between the arbitrary valuation employed to calculate the change in the index with a At step 310, the service provider server 240 may receive a future daily settlement price for one or more of the constituent stocks and assets utilized to determine the stock index value. For example, a third party may determine the daily settlement price for a futures contract listed as a party of the stock index and a third party server 250 may provide the settlement information and price to the service provider server 240, such as via the network 230. Alternatively or in addition, the service provider server 240 may determine the stock index value based on the received daily settlement information. Alternatively or in addition, the service provider server 240 may receive the value of any underlying price index, such as a fixed income index.

At step 320, the service provider server 240 may receive the dividend accrual value of the constituent stocks and assets of the stock index for the current period to date. For example, a third party may determine the dividend accrual value and a third party server 250 may provide the dividend accrual value to the service provider server 240. In the example of a fixed income index, the service provider server 240 may receive the income flow accrual of the constituents stocks and assets comprising the index for the period, such as the coupon payment accrual. Alternatively or in addition, the service provider server 240 may calculate the dividend accrual value.

At step 330, the service provider server 240 determines whether the current period has ended. For example, if the periods are quarterly, the current period may end at the end of the current quarter. If, at step 330, the service provider server 240 determines that the current period has ended the process and algorithm continues to step 340.

At step 340, the service provider server 240 recalibrates or adjusts the received daily settlement price of the stock index downward by the price of the received dividend accrual. In this manner, the arbitrary valuation is transformed and replaced by a meaningful valuation statistic. In one embodiment, the service provider server 240 may offset or remove the price of the dividends accrued for the preceding period from the price of the index. If a short position holder 120 and a long position holder 110 transacted in futures contract based on the periodic reset total return index, the short position holder 120 may pass the dividends accrued for the preceding period to the long position holder 110.

At step 370, the service provider server 240 facilitates passing the dividends accrued for the period from the short position holder 120 to the long position holder 110. For example, the service provider 140 may act as an intermediary, or a counterparty, for passing the accrued dividends from the short position holder 120 to the long position holder 110. Alternatively, or in addition, the short position holder 120 may pay the accrued dividends directly to the long position holder 110.

At step 380, the service provider server 240 may re-calibrate the periodic reset total return index to account for the dividends paid from the short position holder 120 to the long position holder 110. For example, the amount of the dividends paid out may be subtracted from the periodic reset total return index, such that the value of the periodic reset total return index is substantially equivalent to the value of the underlying index.

At step 360, the service provider server 240 may provide the calculated periodic reset total return value to the market participants. For example, the service provider server 240 may provide the periodic reset total return value to one or more long position holders 110 and one or more short position holders 120, such as through the computing devices 210, 220.

If, at step 330, the service provider server 240 determines that the current period has not ended, the service provider server 240 moves to step 350. At step 350, the service provider server 240 facilitates passing the dividends accrued for the period from the short position holder 120 to the long position holder 110. For example, the service provider 140 may act as an intermediary, or a counterparty, for passing the accrued dividends from the short position holder 120 to the long position holder 110. Alternatively, or in addition, the short position holder 120 may pay the accrued dividends directly to the long position holder 110. The process or algorithm proceeds to step 360 as discussed above.

Figure 4:
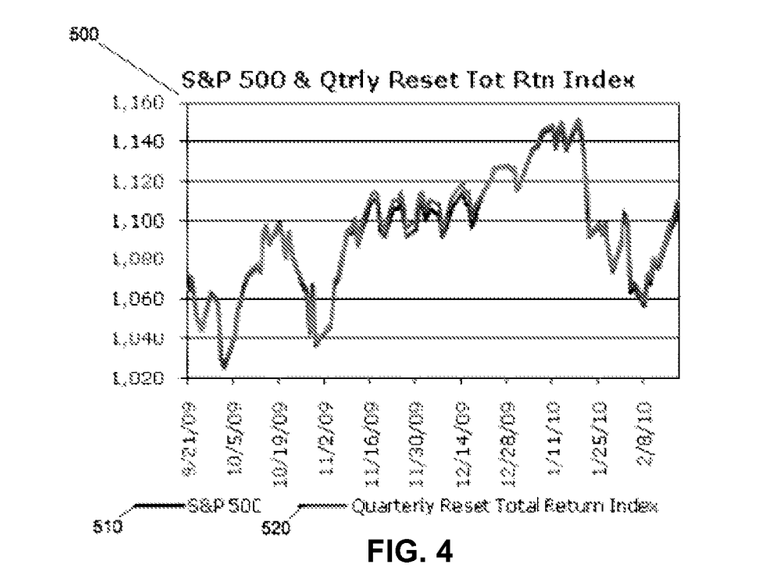
FIG. 4 is a graph illustrating a comparison between the value of a stock index and a periodic reset total return index based on the stock index.

FIG. 4 is a graph 500 illustrating a comparison between the value of a stock index and a periodic reset total return index based on the stock index. The graph 500 includes an underlying index line 510 and a periodic reset total return index line 520. The lines 510, 520 of the graph 500 demonstrate that the value of the periodic reset total return index closely matches the value of the underlying stock index. The amount by which the periodic reset total return index differs from the underlying index may be substantially equivalent to the value of the dividends accrued for the current period.

FIG. 5 is a graph 600 illustrating the difference in value between a stock index and a periodic reset total return index based on the stock index. The graph 600 demonstrates that the periodic reset total return index grows larger than the underlying index as dividends accrue for a given period. However, at the end of the given period, such as at the end of a quarter, the periodic reset total return index is reset, or recalibrated, to align with the underlying stock index. For example, in the graph 600, the periodic reset total return index was reset at the point in time point between "Dec. 14, 2009" and "Dec. 28, 2009" where the difference between the indexes is 0, i.e. the indexes are substantially equivalent.

FIG. 6 is a user interface 700 displaying exemplary terms for a futures contract based on a periodic reset total return index. The user interface 700 may include a contract value section 705, a tick size section 710, a listing cycle section 715, a hours of trade section 720, a termination of trading section 725, a final settlement section 730, a final settlement date section 735, a limits section 740, and a ticker section 745.

The contract value section 705 may display the value of the futures contracts. For example, the contract value may be $50 times the periodic reset total return index. The tick size section 710 may display the tick size for the futures contract. The tick size may be the smallest increment that the price can change. For example, the tick size may be 0.25 index points, or the equivalent of $12.50 per tick. The listing cycle section 715 may display the listing cycle for the futures contract. For example, the listing cycle may be five months in a March quarterly cycle, i.e. March, June, September, and December. The listing cycle may also determine when the periodic reset total return index is recalibrated, or reset. The hours of trade section 720 may display the hours of trading for the futures contract. For example, the hours of trading may be Mondays-Thursdays. The termination of trading section 725 may display the end of trading for the futures contract. For example, the termination of trading may be 8:30 AM (CT) on the third Friday of the contract month. The final settlement section 730 may display the final settlement terms for the futures contracts. For example, the final settlement terms may be a cash settlement at the value of the periodic reset total return index at the expiration of the contract. The final settlement date section 735 may display the date of the final settlement. For example, the final settlement date may be the third Friday of the contract month with contingencies if the underlying reference value should not be published on that day. The limits section 740 may display the limits for the futures contracts. For example, the limits may be at declines of 10%, 20%, and 30%. The ticker section 745 may display the clearing information and the ticker information.

Figure 7C:
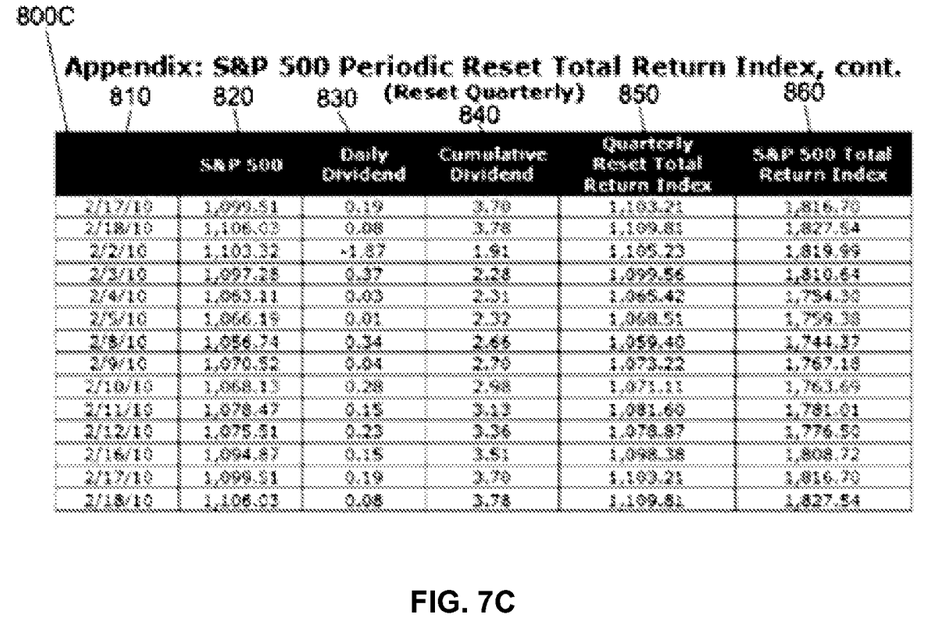

FIGS. 7A-C are tables 800A-C of exemplary values over a period of time for a stock index, a total return index based on the stock index and a periodic reset total return index based on the stock index. The tables 800A-C may display exemplary values for a date column 810, a underlying index column 820, a daily dividend column 830, a cumulative dividend for current period column 840, a periodic reset total return index column 850, and a total return index column 860. The values of the total return index column 860 and the periodic reset total return index column 850 may be based on the values of the underlying index column 820 and the dividends accrued through the current period. The tables 800A-C demonstrate that the values of the periodic reset total return column 850 closely correlate with the values of the underlying index column, while the values of the total return index column 860 do not. Thus, market participants may be able to easily understand the periodic reset total return index value in terms of the underlying index value. However, it may be difficult for market participants to comprehend the total return index in terms of the underlying index value. Furthermore, the values of the cumulative dividend column 840 are easily determinable from the values of the periodic reset total return index column 850, such as by subtracting the values of the periodic return index column 850 from the underlying index column 820. Thus, market participants can easily identify an amount of the periodic reset total return attributed to the dividends accrued for the period. However, there may not be a simple way to derive the value of the dividends from the total return index column 860.

The tables 800A-C also demonstrate the recalibration of the periodic reset total return index. For example, in the table 800B on Dec. 20, 2009 the period ended, and on Dec. 21, 2009 the periodic reset total return index was recalibrated to coincide with the underlying stock index. However, the values of the total return index column 860 are not recalibrated as the total return index is not reset after each period.

Figure 8:
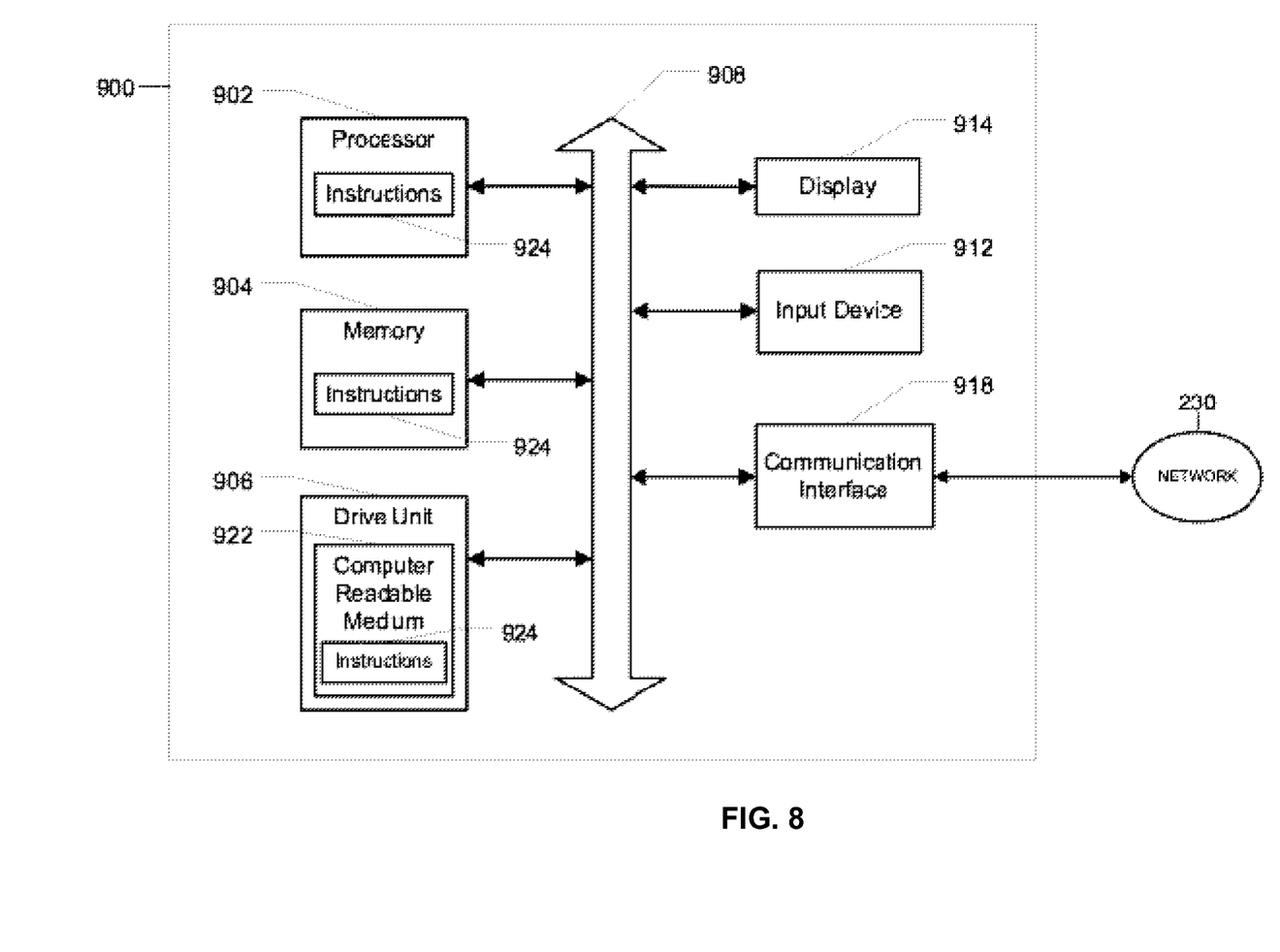
FIG. 8 is an illustration of a general computer system that may be used in a periodic reset total return index valuation.

FIG. 8 illustrates a general computer system 900, which may represent a computer used in a periodic reset total return index valuation, such as the service provider server 240, or any of the other computing devices referenced herein. The computer system 900 may include a set of instructions 924 that may be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 900 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 924 (sequential or otherwise) that specify actions to be taken by that machine. In a particular embodiment, the computer system 900 may be implemented using electronic devices that provide voice, video or data communication. Further, while a single computer system 900 may be illustrated, the term "system" shall also be taken to include any collection of systems or subsystems that individually or jointly execute a set, or multiple sets, of instructions to perform one or more computer functions.

As illustrated in FIG. 8, the computer system 900 may include a processor 902, such as, a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 904 may include a cache or random access memory for the processor 902. Alternatively or in addition, the memory 904 may be separate from the processor 902, such as a cache memory of a processor, the system memory, or other memory. The memory 904 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 904 may be operable to store instructions 924 executable by the processor 902. The functions, acts or tasks illustrated in the figures or described herein may be performed by the programmed processor 902 executing the instructions 924 stored in the memory 904. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 900 may further include a display 914, such as a liquid crystal display (LCD), an organic light emitting diode (OLED), a flat panel display, a solid state display, a cathode ray tube (CRT), a projector, a printer or other now known or later developed display device for outputting determined information. The display 914 may act as an interface for the user to see the functioning of the processor 902, or specifically as an interface with the software stored in the memory 904 or in the drive unit 906.

Additionally, the computer system 900 may include an input device 912 configured to allow a user to interact with any of the components of system 900. The input device 912 may be a number pad, a keyboard, or a cursor control device, such as a mouse, or a joystick, touch screen display, remote control or any other device operative to interact with the system 900.

The computer system 900 may also include a disk or optical drive unit 906. The disk drive unit 906 may include a computer-readable medium 922 in which one or more sets of instructions 924, e.g. software, can be embedded. Further, the instructions 924 may perform one or more of the methods or logic as described herein. The instructions 924 may reside completely, or at least partially, within the memory 904 and/or within the processor 902 during execution by the computer system 900. The memory 904 and the processor 902 also may include computer-readable media as discussed above.

The present disclosure contemplates a computer-readable medium 922 that includes instructions 924 or receives and executes instructions 924 responsive to a propagated signal; so that a device connected to a network 230 may communicate voice, video, audio, images or any other data over the network 230. Further, the instructions 924 may be transmitted or received over the network 230 via a communication interface 918. The communication interface 918 may be a part of the processor 902 or may be a separate component. The communication interface 918 may be created in software or may be a physical connection in hardware. The communication interface 918 may be configured to connect with a network 230, external media, the display 914, or any other components in system 900, or combinations thereof. The connection with the network 230 may be a physical connection, such as a wired Ethernet connection or may be established wirelessly as discussed below. Likewise, the additional connections with other components of the system 900 may be physical connections or may be established wirelessly.

The network 230 may include wired networks, wireless networks, or combinations thereof. The wireless network may be a cellular telephone network, an 802.11, 802.16, 802.20, or WiMax network. Further, the network 230 may be a public network, such as the Internet, a private network, such as an intranet, or combinations thereof, and may utilize a variety of networking protocols now available or later developed including, but not limited to TCP/IP based networking protocols.

The computer-readable medium 922 may be a single medium, or the computer-readable medium 922 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 922 may include a solid-state memory such as a memory card or other package that houses one or more non-volatile read-only memories. The computer-readable medium 922 also may be a random access memory or other volatile re-writable memory. Additionally, the computer-readable medium 922 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method for valuating a periodic reset total return index, the method comprising:

identifying an index comprising a plurality of constituents, wherein at least one of the plurality of constituents generates an income flow;

receiving a first valuation of the index and a second valuation of the income flow generated by the at least one of the plurality of constituents for a current period;

calculating a third valuation of a periodic reset total return index by adding the first valuation of the index and the second valuation of the income flow generated by the at least one of the plurality of constituents for the current period;

providing terms of a derivative contract between a plurality of parties based on the third valuation of the periodic reset total return index; and adjusting, on a periodic basis and upon transferring the income flow between the plurality of parties of the derivative contract, the third valuation of the periodic reset total return index by subtracting the second valuation of the income flow generated by the at least one of the plurality of constituents for a previous period from the third valuation of the periodic reset total return index, wherein the identifying of the index, the receiving of the first and the second valuation, the calculating of the third valuation, the providing of the terms of the derivative contract, and the adjusting of the third valuation are performed by a processor.

2. The method of claim 1 further comprising: facilitating, by the processor, formation of a futures contract between a long position holder and a short position holder based on the third valuation of the periodic reset total return index; and providing a first mechanism for transferring, on the periodic basis, the second valuation of the income flow generated by the at least one of the plurality of constituents for a previous period from the short position holder to the long position holder.

3. The method of claim 2 wherein the futures contract settles to a sum of the first valuation of the index and the second valuation of the income flow for the current period.

4. The method of claim 1 wherein the index comprises an equity index or a fixed income index.

5. The method of claim 4 wherein the income flow generated by the at least one of the plurality of constituents comprises a dividend or a coupon payment.

6. The method of claim 1 wherein the periodic basis comprises a monthly basis, a quarterly basis, or an annual basis.

7. The method of claim 1 wherein the adjustment of the third valuation of the periodic reset total return index further occurs at expiration of the derivative contract.

8. The method of claim 1 wherein the index comprising a plurality of constituents is a weighted index.

9. A system for valuating a periodic reset total return index, the system comprising:
 a memory operative to store a first valuation of an index comprising a plurality of constituents, wherein at least one of the constituents generates an income flow, and a second valuation of the income flow generated by the at least one of the plurality of constituents for a given period;
 an interface, coupled to the memory, the interface operative to receive the first valuation of the index and the second valuation of the income flow generated by the at least one of the plurality of constituents; and
 a processor, coupled to the interface, the processor operative to:
 receive, via the interface, the first valuation of the index and the second valuation of the income flow generated by the at least one of the plurality of constituents for a current period;
 calculate a third valuation of a periodic reset total return index by adding the first valuation of the index and the second valuation of the income flow of the plurality of constituents for the current period;
 provide terms of a derivative contract between a plurality of parties based on the third valuation of the periodic reset total return index; and
 adjust, on a periodic basis and upon a transfer of the income flow between the plurality of parties of the derivative contract, the third valuation of the periodic reset total return index by subtracting the second valuation of the income flow generated by the at least one of the plurality of constituents for a previous period from the third valuation of the periodic reset total return index.

10. The system of claim 9 wherein the processor is further operative to facilitate formation of a futures contract between a long position holder and a short position holder based on the third valuation of the periodic reset total return index, and provide a first mechanism for transferring, on the periodic basis, the second valuation of the income flow generated by the at least one of the plurality of constituents for a previous period from the short position holder to the long position holder.

11. The system of claim 10 wherein the futures contract settles to a sum of the first valuation of the index and the second valuation of the income flow for the current period.

12. The system of claim 9 wherein the index comprises an equity index or a fixed income index.

13. The system of claim 12 wherein the income flow generated by the at least one of the plurality of constituents comprises a dividend or a coupon payment.

14. The system of claim 9 wherein the periodic basis comprises a monthly basis, a quarterly basis, or an annual basis.

15. The system of claim 9 wherein the adjustment of the third valuation of the periodic reset total return index further occurs at expiration of the derivative contract.

16. The system of claim 9 wherein the index comprising a plurality of constituents is a weighted index.

* * * * *